Figures 1, 2:
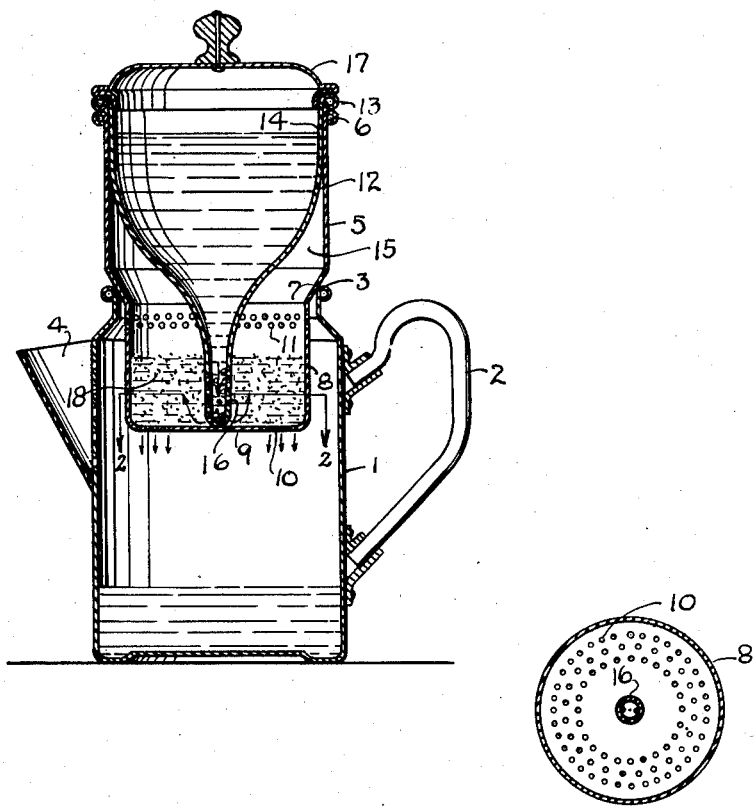

Aug. 28, 1934.  P. KEITH  1,971,490
COFFEE DRIPPER
Filed Sept. 19, 1931

Paul Keith  Inventor

By Jesse R. Stone
&
Lester B. Clark

Attorney

Patented Aug. 28, 1934

1,971,490

UNITED STATES PATENT OFFICE 1,971,490

COFFEE DRIPPER

Paul Keith, Houston, Tex.

Application September 19, 1931, Serial No. 563,714

1 Claim. (Cl. 53—3)

My invention relates to coffee drippers for use in preparing coffee for consumption.

It is an object of the invention to provide a coffee dripper which will be rapid in operation and which will not clog in use.

I desire to so construct the coffee dripping apparatus that the coffee grounds will assume a position above the hot water employed in making coffee, and where the coffee grounds will not clog about the openings through which the coffee passes.

Another object is to provide a simple device which may be made cheaply and supplied to the market at a moderate cost.

In the drawing herewith Fig. 1 is a side view taken in longitudinal section of a coffee dripper embodying my invention.

Fig. 2 is a transverse section taken on the plane 2—2 of Fig. 1.

In constructing my improved coffee dripper I contemplate the use of a coffee pot, one of ordinary construction. The body of the coffee pot is of cylindrical form, with a handle 2 on one side thereof, and a spout 4 on the other, the wall of the container being perforated within the spout. The upper end of the container is decreased slightly in diameter and is provided with a bead 3 around the upper margin thereof.

It will be noted that except for the cover, which is ordinarily employed, this portion of the apparatus is not materially different from the ordinary coffee pot.

The dripping apparatus which goes with this container includes a coffee container 5. This container is preferably cylindrical in form at its upper end, it is tapered inwardly to some extent along the line shown at 7, the lower end 8 being of smaller diameter than the upper portion, said lower portion 8 being adapted to extend downwardly into the coffee pot along the tapered area 7. The bottom of the container 5 is provided with a plurality of fine openings 10, which will be noted particularly from Fig. 2. It is contemplated that these openings will be so small as to allow the water to drip through the same very slowly, straining from the coffee any grounds which may be contained therein. Above the bottom and within the coffee pot are a plurality of openings 11, extending around the wall of the coffee container at a level above the bottom. The upper end of the container 5 is open and reinforced by a bead 6.

Within the container 5 is an approximately conical water receptacle 12. This device is cylindrical for a short distance at 14 adjacent to the upper end, but is tapered away from the wall of the containers 5 to provide a space 15 between the receptacle 12 and the wall of the container 5 into which the coffee grounds may flow. The lower end of the receptacle 12 is formed into a perforated nozzle 16, through which the hot water poured into the receptacle may issue into the container 5. The upper end of the water receptacle may be closed by a cover 17.

In using this coffee dripper the grounds are placed in the bottom of the container 5, in the position shown at 18. The hot water is then poured into the receptacle 12 and will issue gradually through the openings in the nozzle 16. The coffee grounds will be floated upwardly by the water issuing from the nozzle, and will fill the space 15 within the container 5, and the water will drip gradually through the openings 10 and 11. It will be seen that the level of the liquid in the receptacle 12 will be lowered as the coffee drips through the openings 10 in the container. At no time will the coffee grounds interfere with the openings 10 or 11 through which the coffee passes. When the last bit of water in the receptacle 12 issues into the lower end of the container 5 the grounds will still be at a position above the nozzle and will not materially interfere with the passing of the coffee from the container 5 into the coffee pot.

I have found that with a device of this kind coffee can be made rapidly and the hot water coming in contact with the coffee grounds will form coffee in a most effective manner, and that the device will operate constantly without the danger of clogging.

The principal features of value connected with my device are its extreme simplicity and the fact that it is so constructed that its operation will be rapid and effective. All of the valuable constituents of the coffee will be extracted therefrom in the process of operation, and there will be no clogging of the action of the device to interfere with the rapid preparation of the coffee.

What I claim is new is:

A coffee dripper comprising a pot having an open upper end, a coffee container supported on said pot and extending downwardly therein, said container having a series of fine perforations therein; a separate downwardly tapered receptacle for hot water shaped to fit within and seal the upper end of said container, the lower end only of said receptacle being perforated and extended to a point adjacent the bottom of said container to discharge water below the coffee grounds in said container in the manner described, said grounds being free to float upwardly above said perforations.

PAUL KEITH.